United States Patent
Minami et al.

(10) Patent No.: US 6,562,918 B1
(45) Date of Patent: May 13, 2003

(54) OLEFIN POLYMERIZATION CATALYST, METHOD FOR PRODUCING THE SAME AND METHOD FOR PRODUCING OLEFINIC POLYMER

(75) Inventors: Yutaka Minami, Ichihara (JP); Masami Kanamaru, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/646,871

(22) PCT Filed: Feb. 3, 2000

(86) PCT No.: PCT/JP00/00587

§ 371 (c)(1),
(2), (4) Date: Oct. 4, 2000

(87) PCT Pub. No.: WO00/46254

PCT Pub. Date: Aug. 10, 2000

(30) Foreign Application Priority Data

Feb. 4, 1999 (JP) .............................. 11-026805

(51) Int. Cl.[7] .............................. C08F 4/642; C08F 4/02
(52) U.S. Cl. .................. 526/127; 526/129; 526/153; 526/159; 526/160; 526/943; 502/103; 502/104; 502/117; 502/132; 502/120; 204/157.62
(58) Field of Search ................ 502/103, 104, 502/117, 132, 120; 526/153, 159, 160, 127, 943, 129

(56) References Cited

U.S. PATENT DOCUMENTS

| | | | | | |
|---|---|---|---|---|---|
| 5,491,207 A | * | 2/1996 | Hoel | ............. | 526/129 |
| 5,559,199 A | * | 9/1996 | Abe et al. | ............. | 526/160 |
| 5,650,471 A | * | 7/1997 | Abe et al. | ............. | 526/160 |
| 6,143,827 A | * | 11/2000 | Morizono et al. | ......... | 525/192 |

OTHER PUBLICATIONS

Grant & Hackh's Chemical Dictionary, McGraw Hill, 1987, p. 609.*

* cited by examiner

Primary Examiner—David W. Wu
Assistant Examiner—R. Rabago
(74) Attorney, Agent, or Firm—Oblon, Spivak, McClelland, Maier & Neustadt, P.C.

(57) ABSTRACT

A catalyst for olefin polymerization, which is obtained by contacting (A) a compound of a transition metal of Groups 4 to 6 of the Periodic Table, (B) an organoaluminiumoxy compound, and optionally (C) a carrier with each other, and for which they are exposed to elastic waves at least in any step of contacting them with each other. Preferably, the elastic waves are ultrasonic waves falling between 1 and 1000 kHz. Provided are high-activity metallocene catalysts for olefin polymerization. As having high polymerization activity, they are favorable to vapor-phase or slurry polymerization for producing olefinic polymers.

18 Claims, No Drawings

OLEFIN POLYMERIZATION CATALYST, METHOD FOR PRODUCING THE SAME AND METHOD FOR PRODUCING OLEFINIC POLYMER

TECHNICAL FIELD

The present invention relates to a catalyst for olefin polymerization, a method for producing the catalyst, and a method for producing olefinic polymers. Precisely, it relates to a novel, high-activity metallocene catalyst for olefin polymerization, which has the advantage of high polymerization activity in vapor-phase or slurry polymerization to give olefinic polymers, to a method for producing the catalyst, and to a method of using the catalyst in producing olefinic polymers.

BACKGROUND ART

Heretofore used are Ziegler-Natta catalysts in producing polyolefins. In vapor-phase or slurry polymerization to give substantially granular polymer particles, polyolefins produced could have good morphology since the catalyst used is carried on a carrier such as magnesium chloride or silica gel. Recently, a method of using catalysts that comprise a metallocene compound and an aluminoxane has been proposed for producing polyolefins (Japanese Patent Laid-Open Nos. 019309/1983, 167307/1990, etc.). Being different from conventional Ziegler-Natta catalysts, such metallocene catalysts have enabled polymerization of giving polyolefins uniformly dissolved in solvents such as hydrocarbons, etc., and it is known that their polymerization activity per the transition metal therein is extremely high and they give polymers having a narrow molecular weight distribution. Applying metallocene catalysts that are characterized by such features to ordinary vapor-phase or slurry polymerization, if possible, is preferred, as they will not require any additional investment in plant and equipment. However, metallocene catalysts, if applied to vapor-phase or slurry polymerization, must be carried on carriers. One method of carrying metallocene catalysts on carriers is known, which comprises reacting methylaluminoxane with silica gel followed by carrying a metallocene catalyst on the resulting reaction product (Japanese Patent Laid-Open Nos. 188712/1997, 70227/1995, etc.). However, the method is problematic in that the polymerization activity of the metallocene catalyst carried on such a carrier and used therein is lower than that of a metallocene catalyst in a uniform polymerization system. One example of producing propylene in the presence of a prepolymerized solid catalyst, which is prepared by ultrasonically prepolymerizing an olefin with a catalyst, is disclosed in Japanese Patent Laid-Open No. 120716/1998. However, the prepolymerized solid catalyst is problematic in that it is unstable. At present, metallocene catalysts carried on carriers, which are substantially applicable to vapor-phase or slurry polymerization with no reduction in their activity, could not be obtained. In addition, even in uniform polymerization in which are usedmetallocene catalysts, a large amount of aluminoxanes relative to transition metals must be used. In this, therefore, there are the problems that the polymerization activity per aluminium of the catalysts used is low and that aluminium remains in the polymers produced.

From the viewpoints noted above, we, the inventors have made the present invention, and the object of the invention is to provide a novel high-activity metallocene catalyst for olefin polymerization, of which the activity is high even in vapor-phase or slurry polymerization to give olefinic polymers and which realizes reducing the amount of aluminoxanes to be used along with it, to provide a method for producing the catalyst, and to provide a method for producing olefinic polymers.

DISCLOSURE OF THE INVENTION

We, the present inventors have assiduously studied so as to attain the object as above, and, as a result, have found that a metallocene catalyst for olefin polymerization, which is obtained by subjecting a transition metal compound, an organoaluminiumoxy compound and optionally a carrier to specific treatment, more precisely, a metallocene catalyst for olefin polymerization, which is obtained by contacting a compound of a transition metal compound of Groups 4 to 6 of the Periodic Table, an organoaluminiumoxy compound and optionally a carrier with each other while being exposed to elastic waves, can effectively attain the object. On the basis of this finding, we have completed the present invention. Specifically, the invention provides a catalyst for olefin polymerization, a method for producing it, and a method for producing olefinic polymers, which are as follows:

1. A catalyst for olefin polymerization, which is obtained by contacting (A) a compound of a transition metal of Groups 4 to 6 of the Periodic Table, (B) an organoaluminiumoxy compound, and optionally (C) a carrier with each other, and for which they are exposed to elastic waves at least in any step of contacting them with each other.

2. The catalyst for olefin polymerization of above 1, in which (A) is any of the following general formula (I), (II) or (III):

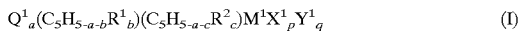 (I)

 (II)

 (III)

wherein $Q^1$ represents a bonding group that crosslinks the two conjugated five-membered cyclic ligands $(C_5H_{5-a-b}R^1_b)$ and $(C_5H_{5-a-c}R^2_c)$; $Q^2$ represents a bonding group that crosslinks the conjugated five-membered cyclic ligand $(C_5H_{5-a-d}R^3_d)$ and the group $Z^1$; $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; b, c and d each represent an integer of from 0 to 5 when a=0, or an integer of from 0 to 4 when a=1, or an integer of from 0 to 3 when a=2; p+q=[(the valency of $M^1$)−2]; r+s=[(the valency of $M^1$)−1]; $M^1$ represents a transition metal of Groups 4 to 6 of the Periodic Table; $X^1$, $Y^1$ and $Z^1$ each represent a covalent-bonding or ionic-bonding ligand; plural $X^1$'s and $Y^1$'s, if any, may be the same or different, and may be bonded to each other to form a cyclic structure.

3. The catalyst for olefin polymerization of above 1 or 2, in which (C) has a mean particle size of from 1 to 300 μm, a specific surface area of from 1 to 1000 m²/g, and a pore volume of from 0.1 to 5 cm³/g.

4. The catalyst for olefin polymerization of any of above 1 to 3, for which the elastic waves are ultrasonic waves.

5. The catalyst for olefin polymerization of any of above 1 to 4, for which the frequency of the ultrasonic waves falls between 1 and 1000 kHz.

6. A method for producing a catalyst for olefin polymerization, which comprises contacting (A) a compound of a transition metal of Groups 4 to 6 of the Periodic Table, (B) an organoaluminiumoxy compound, and optionally (C) a carrier with each other, and in which they are exposed to elastic waves at least in any step of contacting them with each other.

7. A method for producing olefinic polymers, which comprises polymerizing or copolymerizing olefins in the presence of the olefin polymerization catalyst of any of above 1 to 5.

8. A method for producing olefinic polymers, which comprises polymerizing or copolymerizing olefins in the presence of the olefin polymerization catalyst of any of above 1 to 5 and an organoaluminium compound.

BEST MODES OF CARRYING OUT THE INVENTION

The invention is a catalyst for olefin polymerization, which is obtained by contacting (A) a compound of a transition metal of Groups 4 to 6 of the Periodic Table, (B) an organoaluminiumoxy compound, and optionally (C) a carrier with each other, and for which they are exposed to elastic waves at least in any step of contacting them with each other; a method for producing the catalyst; and a method of using the catalyst for producing olefinic polymers. The olefin polymerization catalyst [I]; the method for producing the catalyst [II]; and the method for producing olefinic polymers [III] are described in detail hereinunder.

[I] Olefin Polymerization Catalyst

The olefin polymerization catalyst of the invention is obtained by contacting (A) a compound of a transition metal of Groups 4 to 6 of the Periodic Table, (B) an organoaluminiumoxy compound, and optionally (C) a carrier with each other, for which they are exposed to elastic waves at least in any step of contacting them with each other.

(A) Compound of Transition Metal of Groups 4 to 6 of the Periodic Table:

The compound of a transition metal of Groups 4 to 6 of the Periodic Table (A) includes metallocenes. Metallocenes include transition metal compounds having one or two ligands of a cyclopentadienyl group, a substituted cyclopentadienyl group, an indenyl group, a substituted indenyl group and the like, and also transition metal compounds having the ligands geometrically controlled, such as those described in Japanese Patent Laid-Open Nos. 19309/1983, 130314/1986, 163088/1991, 300887/1992 and 211694/1992, International Patent Publication No. 502036/1989, etc., and they are characterized by uniform properties of the active points therein. Above all for the component (A) in the invention, preferred are metallocenes of the following general formula (I), (II) or (III):

  (I)

  (II)

  (III)

wherein $Q^1$ represents a bonding group that crosslinks the two conjugated five-membered cyclic ligands $(C_5H_{5-a-b}R^1_b)$ and $(C_5H_{5-a-c}R^2_c)$; $Q^2$ represents a bonding group that crosslinks the conjugated five-membered cyclic ligand $(C_5H_{5-a-d}R^3_d)$ and the group $Z_1$; $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; b, c and d each represent an integer of from 0 to 5 when a=0, or an integer of from 0 to 4 when a=1, or an integer of from 0 to 3 when a=2; p+q=[(the valency of $M^1$)−2]; r+s=[(the valency of $M^1$)−1]; $M^1$ represents a transition metal of Groups 4 to 6 of the Periodic Table; $X^1$, $Y^1$ and $Z^1$ each represent a covalent-bonding or ionic-bonding ligand; plural $X^1$'s and $Y^1$'s, if any, may be the same or different, and may be bonded to each other to form a cyclic structure.

Specific examples of $Q^1$ and $Q^2$ include (1) an alkylene group having from 1 to 4 carbon atoms, or a cycloalkylene group, or the group substituted by a lower alkyl or phenyl group at its side chain, such as a methylene group, an ethylene group, an isopropylene group, a methylphenylmethylene group, a diphenylmethylene group, a cyclohexylene group, etc.; (2) a silylene group, or an oligosilylene group, or the group substituted by a lower alkyl or phenyl group at its side chain, such as a silylene group, a dimethylsilylene group, a methylphenylsilylene group, a diphenylsilylene group, a disilylene group, a tetramethyldisilylene group, etc.; and (3) a hydrocarbon group (e.g., a lower alkyl group, a phenyl group, a hydrocarbyloxy group (preferably, a lower alkoxy group), etc.) containing germanium, phosphorus, nitrogen, boron or aluminium, such as a $(CH_3)_2Ge$ group, a $(C_6H_5)_2Ge$ group, a $(CH_3)_2P$ group, a $(C_6H_5)_2P$ group, a $(C_4H_9)N$ group, a $(C_6H_5)N$ group, a $(CH_3)B$ group, a $(C_4H_9)B$ group, a $(C_6H_5)B$ group, a $(C_6H_5)Al$ group, a $(CH_3O)Al$ group, etc. Of those, preferred are alkylene groups and silylene groups in view of their activity.

$(C_5H_{5-a-b}R^1_b)$, $(C_5H_{5-a-c}R^2_c)$ and $(C_5H_{5-a-d}R^3_d)$ are conjugated, 5-membered cyclic ligands, in which $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; and b, c and d each represent an integer of from 0 to 5 when a=0, or an integer of from 0 to 4 when a=1, or a integer of from 0 to 3 when a=2. The hydrocarbon group preferably has from 1 to 20 carbon atoms, more preferably from 1 to 12 carbon atoms. The hydrocarbon group may be a monovalent one that bonds to the cyclopentadienyl group of a conjugated, 5-membered cyclic group. Two of plural hydrocarbon groups, if any, may be bonded to each other to form a cyclic structure along with a part of the cyclopentadienyl group. Specific examples of those conjugated, 5-membered cyclic ligands are substituted or unsubstituted cyclopentadienyl groups, indenyl groups and fluorenyl groups. The halogen atom includes chlorine, bromine, iodine and fluorine atoms. The alkoxy group preferably has from 1 to 12 carbon atoms. The silicon-containing hydrocarbon group includes, for example, groups of $-Si(R^4)(R^5)(R^6)$, in which $R^4$, $R^5$ and $R^6$ each represent a hydrocarbon group having from 1 to 24 carbon atoms. As the phosphorus-containing hydrocarbon group, the nitrogen-containing hydrocarbon group and the boron-containing hydrocarbon group, for example, mentioned are groups of $-P(R^7)(R^8)$, $-N(R^7)(R^8)$, and $-B(R^7)(R^8)$, respectively, in which $R^7$ and $R^8$ each represent a hydrocarbon group having from 1 to 18 carbon atoms. Plural $R^1$'s, $R^2$'s and $R^3$'s, if any, may be the same or different ones, respectively. In formula (I), the conjugated, 5-membered cyclic ligands $(C_5H_{5-a-b}R^1_b)$ and $(C_5H_{5-a-c}R^2_c)$ may be the same or different ones.

$M^1$ represents a transition metal element of Groups 4 to 6 of the Periodic Table, including, for example, titanium, zirconium, hafnium, vanadium, niobium, molybdenum, tungsten, etc. Of those, preferred are titanium, zirconium and hafnium in view of their activity. $Z^1$ represents a covalent-bonding ligand, including, for example, a halogen atom, an oxygen atom (—O—), a sulfur atom (—S—), an alkoxy group having from 1 to 20, preferably from 1 to 10 carbon atoms, a thioalkoxy group having from 1 to 20, preferably from 1 to 12 carbon atoms, a nitrogen-containing hydrocarbon group having from 1 to 40, preferably from 1 to 18 carbon atoms, and a phosphorus-containing hydrocarbon group having from 1 to 40, preferably from 1 to 18 carbon atoms. $X^1$ and $Y^1$ may be bonded to each other to form a cyclic structure. Specifically, plural $X^1$'s, if any, may be bonded to each other to form a cyclic structure; or plural $Y^1$'s, if any, may be bonded to each other to form a cyclic structure; or $X^1$ and $Y^1$ may be bonded to each other to form a cyclic structure. $X^1$ and $Y^1$ each represent a covalent-bonding or ionic-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.) a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are halogen atoms and hydrocarbon groups. $X^1$ and $Y^1$ may be the same or different ones.

Preferred and typical examples of the transition metal compounds of formula (I), (II) or (III) are those in which $Q^1$ represents a bonding group that crosslinks the two conjugated five-membered cyclic ligands $(C_5H_{5-a-b}R^1{}_b)$ and $(C_5H_{5-a-c}R^2{}_c)$; $Q^2$ represents a bonding group that crosslinks the conjugated five-membered cyclic ligand $(C_5H_{5-a-d}R^3{}_d)$ and the group $Z^1$; $Q^1$ and $Q^2$ each are an alkylene group or a silylene group; $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; b, c and d each represent an integer of from 0 to 5 when a=0, or an integer of from 0 to 4 when a=1, or an integer of from 0 to 3 when a=2; p+q=[(the valency of $M^1$)–2]; r+s=[(the valency of $M^1$)–1]; $M^1$ represents a transition metal of Groups 4 to 6 of the Periodic Table, and is titanium, zirconium or hafnium; $X^1$, $Y^1$ and $Z^1$ each represent a covalent-bonding or ionic-bonding ligand and may be bonded to each other to form a cyclic structure; $X^1$ and $Y^1$ each are a halogen atom or a hydrocarbon group; $Z^1$ is an alkoxy group having from 1 to 10 carbon atoms, a thioalkoxy group having from 1 to 12 carbon atoms, a nitrogen-containing hydrocarbon group having from 1 to 18 carbon atoms, or a phosphorus-containing hydrocarbon group having from 1 to 18 carbon atoms.

As specific examples of the transition metal compounds of formula (I) or (II), mentioned are the following compounds.

<1> Transition metal compounds not having a crosslinkable bonding group but having two conjugated, 5-membered cyclic ligands, such as bis(cyclopentadienyl)zirconium dichloride, bis(methylcyclopentadienyl)zirconium dichloride, bis(dimethylcyclopentadienyl)zirconium dichloride, bis(trimethylcyclopentadienyl)zirconium dichloride, bis(tetramethylcyclopentadienyl)zirconium dichloride, bis(pentamethylcyclopentadienyl)zirconium dichloride, bis(n-butylcyclopentadienyl)zirconium dichloride, bis(indenyl)zirconium dichloride, bis(fluorenyl)zirconium dichloride, bis(cyclopentadienyl)zirconium chlorohydride, bis(cyclopentadienyl)methylzirconium chloride, bis(cyclopentadienyl)methylzirconium chloride, bis(cyclopentadienyl)phenylzirconium chloride, bis(cyclopentadienyl)dimethylzirconium, bis(cyclopentadienyl)diphenylzirconium, bis(cyclopentadienyl)dineopentylzirconium, bis(cyclopentadienyl)dihydrozirconium, (cyclopentadienyl)(indenyl)zirconium dichloride, (cyclopentadienyl)(fluorenyl)zirconium dichloride, etc.

<2> Transition metal compounds having two conjugated, 5-membered cyclic ligands, in which the two ligands are crosslinked with an alkylene group, such as methylenebis(indenyl)zirconium dichloride, ethylenebis(indenyl)zirconium dichloride, methylenebis(indenyl)zirconium chlorohydride, ethylenebis(indenyl)methylzirconium chloride, ethylenebis(indenyl)methoxychlorozirconium, ethylenebis(indenyl)zirconium diethoxide, ethylenebis(indenyl)dimethylzirconium, ethylenebis (4,5,6,7-tetrahydroindenyl)zirconium dichloride, ethylenebis(2-methylindenyl)zirconium dichloride, ethylenebis(2,4-dimethylindenyl)zirconium dichloride, ethylenebis (2-methyl-4-phenylindenyl)zirconium dichoride, ethylenebis(2-methyl-4-naphthylindenyl)zirconium dichloride, ethylenebis(2-methyl-4,5-benzoindenyl)zirconium dichloride, ethylenebis(2-methyl-4-trimethylsilylindenyl)zirconium dichloride, ethylenebis(2,4-dimethyl-5,6,7-trihydroindenyl)zirconium dichloride, ethylene(2,4-dimethylcyclopentadienyl)(3',5'-dimethylcyclopentadienyl)zirconium dichloride, ethylene(2-methyl-4-t-butylcyclopentadienyl)(3'-t-butyl-5'-methylcyclopentadienyl)zirconium dichloride, ethylene(2,3,5-trimethylcyclopentadienyl)(2',4',5'-trimethylcyclopentadienyl)zirconium dichloride, isopropylidenebis(2-methylindenyl)zirconium dichloride, isopropylidenebis(indenyl)zirconium dichloride, isopropylidenebis (2,4-dimethylindenyl)zirconium dichloride, isopropylidene(2,4-dimethylcyclopentadienyl)(3',5'-dimethylcyclopentadienyl)zirconium dichloride, isopropylidene(2-methyl-4-t-butylcyclopentadienyl)(3'-t-butyl-5'-methylcyclopentadienyl)zirconium dichloride, methylene(cyclopentadienyl)(3,4-dimethylcyclopentadienyl)zirconium dichloride, methylene(cyclopentadienyl)(3,4-dimethylcyclopentadienyl)zirconium chlorohydride, methylene(cyclopentadienyl)(3,4-dimethylcyclopentadienyl)dimethylzirconium, methylene(cyclopentadienyl)(3,4-dimethylcyclopentadienyl)diphenylzirconium, methylene(cyclopentadienyl)(trimethylcyclopentadienyl)-zirconium dichloride, methylene(cyclopentadienyl)(tetramethylcyclopentadienyl)-zirconium dichloride, isopropylidene(cyclopentadienyl)(3,4-dimethylcyclopentadienyl)zirconium dichloride, isopropylidene(cyclopentadienyl)(2,3,4,5-tetramethylcyclopentadienyl)zirconium dichloride, isopropylidene(cyclopentadienyl)(3-methylindenyl)zirconium dichloride, isopropylidene(cyclopentadienyl)(fluorenyl)zirconium dichloride, isopropylidene(2-methylcyclopentadienyl)(fluorenyl)zirconium dichloride, isopropylidene(2,5-dimethylcyclopentadienyl)(3,4-dimethylcyclopentadienyl)zirconium dichloride, isopropylidene(2,5-dimethylcyclopentadienyl)(fluorenyl)zirconium dichloride, ethylene(cyclopentadienyl)(3,5-dimethylcyclopentadienyl)zirconium dichloride, ethylene(cyclopentadienyl)(fluorenyl)zirconium dichloride, ethylene(2,5-dimethylcyclopentadienyl)(fluorenyl) zirconium dichloride, ethylene(2,5-diethylcyclopentadienyl)(fluorenyl)zirconium dichloride, diphenylmethylene(cyclopentadienyl)(3,4-diethylcyclopentadienyl) zirconium dichloride, diphenylmethylene (cyclopentadienyl)(3,4-diethylcyclopentadienyl) zirconium dichloride, cyclohexylidene(cyclopentadienyl)(fluorenyl)zirconium dichloride, cyclohexylidene(2,5-dimethylcyclopentadienyl)(3',4'-dimethylcyclopentadienyl)zirconium dichloride, ethylenebis(2,4,7-trimethylindenyl)zirconium dichloride, etc.

<3> Transition metal compounds having two silylene-crosslinked, conjugated, 5-membered cyclic ligands, such as dimethylsilylenebis(2,2,7-trimethylindenyl)zirconium dichloride, dimethylsilylenebis(indenyl)zirconium dichloride, dimethylsilylenebis(4,5,6,7-tetrahydroindenyl)zirconium dichloride, dimethylsilylenebis(2-methylindenyl)zirconium dichloride, dimethylsilylenebis(2,4-dimethylindenyl)zirconium dichloride, dimethylsilylenebis(2,4-dimethylcyclopentadienyl)(3',5'-dimethylcyclopentadienyl)zirconium dichloride, dimethylsilylenebis(2-methyl-4,5-benzoindenyl) zirconium dichloride, dimethylsilylenebis(2-methyl-4-naphthylindenyl)zirconium dichloride, dimethylsilylenebis(2-methyl-4-phenylindenyl)zirconium dichloride, phenylmethylsilylenebis(indenyl)zirconium dichloride, phenylmethylsilylenebis(4,5,6,7-tetrahydroindenyl)zirconium dichloride, phenylmethylsilylenebis(2,4-dimethylindenyl)zirconium dichloride, phenylmethylsilylene(2,4-dimethylcyclopentadienyl)(3',5'-dimethylcyclopentadienyl)zirconium dichloride, phenylmethylsilylene(2,3,5-trimethylcyclopentadienyl)(2',4',5'-trimethylcyclopentadienyl) zirconium dichloride, phenylmethylsilylenebis(tetramethylcyclopentadienyl)-zirconium dichloride, diphenylsilylenebis(2,4-dimethylindenyl)zirconium dichloride, diphenylsilylenebis(indenyl)zirconium dichloride, diphenylsilylenebis(2-methylindenyl)zirconium dichloride, tetramethyldisilylenebis(indenyl) zirconium dichloride, tetramethyldisilylenebis (cyclopentadienyl)zirconium dichloride, tetramethyldisilylene(3-methylcyclopentadienyl)(indenyl)zirconium dichloride, dimethylsilylene(cyclopentadienyl)(3,4-dimethylcyclopentadienyl)zirconium dichloride, dimethylsilylene-(cyclopentadienyl)(trimethylcyclopentadienyl)zirconium dichloride, dimethylsilylene-(cyclopentadienyl)(tetramethylcyclopentadienyl) zirconium dichloride, dimethylsilylene(cyclopentadienyl) (3,4-diethylcyclopentadieny)zirconium dichloride, dimethylsilylene-(cyclopentadienyl)(triethylcyclopentadienyl)zirconium dichloride, dimethylsilylene-(cyclopentadienyl)(tetraethylcyclopentadienyl)zirconium dichloride, dimethylsilylene(cyclopentadienyl)(fluorenyl)zirconium dichloride, dimethylsilylene(cyclopentadienyl)(2,7-di-t-butylfluorenyl)zirconium dichloride, dimethylsilylene-(cyclopentadienyl)(octahydrofluorenyl) zirconium dichloride, dimethylsilylene(2-methylcyclopentadienyl)(fluorenyl)zirconium dichloride, dimethylsilylene(2,5-dimethylcyclopentadienyl) (fluorenyl)zirconium dichloride, dimethylsilylene(2-ethylcyclopenadienyl)(fluorenyl) zirconium dichloride, dimethylsilylene (2,5-diethylcyclopentadienyl) (fluorenyl)zirconium dichloride, diethylsilylene(2-methylcyclopentadienyl)(2',7'-di-t-butylfluorenyl) zirconium dichloride, dimethylsilylene(2,5-dimethylcyclopentadienyl)(2',7'-di-t-butylfluorenyl) zirconium dichloride, dimethylsilylene(2-ethylcyclopentadienyl)(2',7'-di-t-butylfluorenyl) zirconium dichloride, dimethylsilylene(diethylcyclopentadienyl)(2,7-di-t-butylfluorenyl)zirconium dichloride, dimethylsilylene-(methylcyclopentadienyl)(octahydrofluorenyl)zirconium dichloride, dimethylsilylene-(dimethylcyclopentadienyl)(octahydrofluorenyl) zirconium dichloride, dimethylsilylene-(ethylcyclopentadienyl)(octahydrofluorenyl)zirconium dichloride, dimethylsilylene-(diethylcyclopentadienyl)(octahydrofluorenyl)zirconium dichloride, etc.

<4> Transition metal compounds having two conjugated, 5-membered cyclic ligands, in which the two ligands are crosslinked with a germanium-, aluminium-, boron-, phosphorus- or nitrogen-containing hydrocarbon group, such as dimethylgermylenebis(indenyl)zirconium dichloride, dimethylgermylene(cyclopentadienyl) (fluorenyl)zirconium dichloride, methylalumylenebis (indenyl)zirconium dichloride, phenylaminylenebis (indenyl)zirconium dichloride, phenylphosphylenebis (indenyl)zirconium dichloride, ethylborylenebis(indenyl) zirconium dichloride, phenylaminylenebis(indenyl) zirconium dichloride, phenylaminylene (cyclopentadienyl)(fluorenyl)zirconium dichloride, etc.

<5> Transition metal compounds having one conjugated, 5-membered cyclic ligand, such as pentamethylcyclopentadienyl-bis(phenyl)aminozirconium dichloride, indenyl-bis(phenyl)aminozirconium dichloride, pentamethylcyclopentadienyl-bis(trimethylsilyl) aminozirconium dichloride, pentamethylcyclopentadienylphenoxyzirconium dichloride, dimethylsilylene (tetramethylcyclopentadienyl)-t-butylaminozirconium dichloride, dimethylsilylene-(tetramethylcyclopentadienyl)phenylaminozirconium dichloride, dimethylsilylene(tetrahydroindenyl)decylaminozirconium dichloride, dimethylsilylene(tetrahydroindenyl)-[bis (trimethylsilyl)amino]zirconium dichloride, dimethylgermylene-(tetramethylcyclopentadienyl) phenylaminozirconium dichloride, pentamethylcyclopentadienylzirconium trimethoxide, pentamethylcyclopentadienylzirconium trichloride, (t-butylamido)(tetramethyl-$\eta^5$-cyclopentadienyl)silane-titaniumdimethyl, (t-butylamido)(tetramethyl-$\eta^5$-cyclopentadienyl)-1,2-ethane-diyltitanium dichloride, (methylamido) (tetramethyl-$\eta^5$-cyclopentadienyl)-1,2-ethane-diyltitanium dichloride, (ethylamido)(tetramethyl-$\eta^5$-cyclopentadienyl)-methylenetitanium dichloride, (t-butylamido)dimethyl-(tetramethyl-$\eta^5$-cyclopentadienyl)silane-titaniumdichloride, (benzylamido)dimethyl-(tetramethyl-$\eta^5$-cyclopentadienyl)silane-titanium dichloride, (phenylphosphido)dimethyl-(tetramethyl-$\eta^5$-cyclopentadienyl)silane-titaniumdibenzyl, etc.

<6> Transition metal compounds having two conjugated, 5-membered cyclic ligands in which the ligands are double-crosslinked, such as (1,1'-dimethylsilylene)(2,2'-isopropylene)bis(cyclopentadienyl)zirconium dichloride, (1,1'-dimethylsilylene)(2,2'-dimethylsilylene)bis (cyclopentadienyl) zirconium dichloride, (1,1'-dimethylsilylene)(2,2'-isopropylidene)-bis (cyclopentadienyl)dimethylzirconium, (1,1'-dimethylsilylene)(2,2'-isopropylidene)-bis (cyclopentadienyl)dibenzylzirconium, (1,1'-dimethylsilylene)(2,2'-isopropylidene)-bis (cyclopentadienyl)bis(trimethylsilyl)zirconium, (1,1'-dimethylsilylene)(2,2'-isopropylidene)-bis (cyclopentadienyl)bis(trimethylsilylmethyl)zirconium, (1,2'-dimethylsilylene)(2,1'-ethylene)-bis(indenyl)

zirconium dichloride, (1,1'-dimethylsilylene)(2,2'-ethylene)-bis(indenyl)zirconium dichloride, (1,1'-ethylene)(2,2'-dimethylsilylene)-bis(indenyl)zirconium dichloride, (1,1'-dimethylsilylene)(2,2'-cyclohexylidene)-bis(indenyl)zirconium dichloride, (1,2'-dimethylsilylene)(2,1'-dimethylsilylene)bis(indenyl)zirconium dichloride, (1,2'-dimethylsilylene)(2,1'-dimethylsilylene)bis(3-methylindenyl)zirconium dichloride, (1,2'-dimethylsilylene)(2,1'-dimethylsilylene)bis(3-n-butylindenyl)zirconium dichloride, etc.

<7> Derivatives from compounds of <1> to <6> noted above, which are produced by substituting the chlorine atoms in those compounds of <1> to <6> with any of a bromine atom, an iodine atom, a hydrogen atom, a methyl group, a phenyl group, a benzyl group, a methoxy group, a dimethylamino group and others, and/or by substituting the zirconium atom in those compounds with any of titanium, hafnium and other atoms.

As specific examples of the transition metal compounds of formula (III), mentioned are the following compounds.

Especially preferred are the transitionmetal compounds of formula (III) in which the group $(C_5H_{5-a-d}R^3_d)$ is any of the following formulae (IV) to (X):

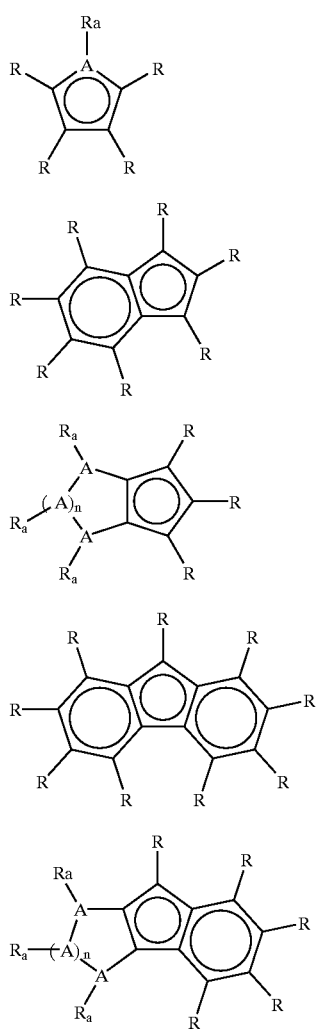

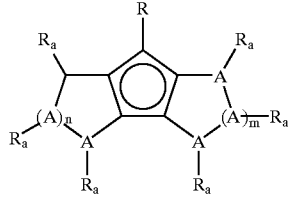

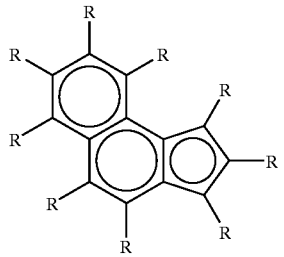

wherein A represents an element of Group 13, 14, 15 or 16, and plural A's maybe the same or different; R represents a hydrogen atom, a halogen atom, an aliphatic hydrocarbon group having from 1 to 30 carbon atoms, an aromatic hydrocarbon group having from 6 to 30 carbon atoms, an alkoxy group having from 1 to 30 carbon atoms, an aryloxy group having from 6 to 30 carbon atoms, a thioalkoxy group having from 1 to 30 carbon atoms, a thioaryloxy group having from 6 to 30 carbon atoms, an amino group, an amido group, a carboxyl group, or an alkylsilyl or alkylsilylalkyl group having from 3 to 30 carbon atoms, and R's may be the same or different, and may be optionally bonded to each other to form a cyclic structure; a represents 0, 1 or 2; and n and m each represent an integer of at least 1.

Specific examples of the group $(C_5H_{5-a-d}R^3_d)$ are mentioned below.

In the indenyl derivatives and the fluorenyl derivatives, the position of each substituent is indicated by the following position numbers.

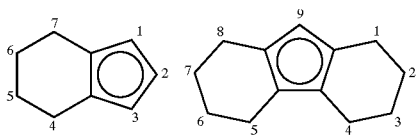

The group $(C_5H_{5-a-d}R^3_d)$ includes, for example, a cyclopentadienyl group, a methylcyclopentadienyl group, a 1,2-dimethylcyclopentadienyl group, a 1,3-dimethylcyclopentadienyl group, a 1,2,3-trimethylcyclopentadienyl group, a 1,3,4-trimethylcyclopentadienyl group, a tetramethylcyclopentadienyl group, a pentamethylcyclopentadienyl group, an ethylcyclopentadienyl group, a 1,2-diethylcyclopentadienyl group, a 1,3-diethylcyclopentadienyl group, a 1,2,3-triethylcyclopentadienyl group, a 1,3,4-triethylcyclopentadienyl group, a tetraethylcyclopentadienyl group, a pentaethylcyclopentadienyl group, an indenyl group, a 1-methylindenyl group, a 1,2-dimethylindenyl group, a 1,3-dimethylindenyl group, a 1,2,3-trimethylindenyl group, a 2-methylindenyl group, a 1-ethylindenyl group, a 1-ethyl-2-methylindenyl group, a 1-ethyl-3-methylindenyl group, a 1-ethyl-2,3-dimethylindenyl group, a 1,2-diethylindenyl group, a 1,3-diethylindenyl group, a 1,2,3-triethylindenyl group, a 2-ethylindenyl group, a 1-methyl-2-ethylindenyl group, a 1,3-dimethyl-2-ethylindenyl group, a 4,5,6,7-tetrahydroindenyl group, a 1-methyl-4,5,6,7- tetrahydroindenyl group, a 1,2-dimethyl-4,5,6,7-tetrahydroindenyl group, a 1,3-dimethyl-4,5,6,7-tetrahydroindenyl group, a 1,2,3-trimethyl-4,5,6,7-tetrahydroindenyl group, a 2-methyl-4,5,6,7-tetrahydroindenyl group, a 1-ethyl-4,5,6,7-tetrahydroindenyl group, a 1-ethyl-2-methyl-4,5,6,7-tetrahydroindenyl group, a 1-ethyl-3-methyl-4,5,6,7-tetrahydroindenyl group, a 1-ethyl-2,3-dimethyl-4,5,6,7-tetrahydroindenyl group, a 1,2-diethyl-4,5,6,7-tetrahydroindenyl group, a 1,2-diethyl-3-methyl-4,5,6,7-tetrahydroindenyl group, a 1,3-diethyl-4,5,6,7-tetrahydroindenyl group, a 1,3-diethyl-2-methyl-4,5,6,7-tetrahydroindenyl group, a 1,2,3-triethyl-4,5,6,7-tetrahydroindenyl group, a 2-ethyl-4,5,6,7-tetrahydroindenyl group, a 1-methyl-2-ethyl-4,5,6,7-tetrahydroindenyl group, a 1,3-dimethyl-2-ethyl-4,5,6,7-tetrahydroindenyl group, a fluorenyl group, a 9-methylfluorenyl group, a 9-ethylfluorenyl group, a 1,2,3,4-tetrahydrofluorenyl group, a 9-methyl-1,2,3,4-tetrahydrofluorenyl group, a 9-ethyl-1,2,3,4-tetrahydrofluorenyl group, a 1,2,3,4,5,6,7,8-octahydrofluorenyl group, a 9-methyl-1,2,3,4,5,6,7,8-octahydrofluorenyl group, a 9-ethyl-1,2,3,4,5,6,7,8-octahydrofluorenyl group, etc.

Specific examples of the transition metal compounds of formula (III) are mentioned below.

They are cyclopentadienyltitanium trichloride, cyclopentadienyltitaniumtrimethyl, cyclopenadienyltitanium trimethoxide, cyclopentadienyltitaniumtribenzyl, methylcyclopentadienyltitanium trichloride, methylcyclopentadienyltitaniumtrimethyl, methylcyclopentadienyltitanium trimethoxide, methylcyclopentadienyltitaniumtribenzyl, dimethylcyclopentadienyltitanium trichloride, dimethylcyclopentadienyltitaniumtrimethyl, dimethylcyclopentadienyltitanium trimethoxide, dimethylcyclopentadienyltitaniumtribenzyl, trimethylcyclopentadienyltitanium trichloride, trimethylcyclopentadienyltitaniumtrimethyl, trimethylcyclopentadienyltitanium trimethoxide, trimethylcyclopentadienyltitaniumtribenzyl, tetramethylcyclopentadienyltitanium trichloride, tetramethylcyclopentadienyltitaniumtrimethyl, tetramethylcyclopentadienyltitanium trimethoxide, tetramethylcyclopentadienyltitaniumtribenzyl, pentamethylcyclopentadienyltitanium trichioride, pentamethylcyclopentadienyltitaniumtrimethyl, pentamethylcyclopentadienyltitanium trimethoxide, pentamethylcyclopentadienyltitaniumtribenzyl, indenyltitanium trichloride, indenyltitanium trimethyl, indenyltitanium trimethoxide, indenyltitaniumtribenzyl, 1-methylindenyltitanium trichloride, 1-methylindenyltitaniumtrimethyl, 1-methylindenyltitanium trimethoxide, 1-mtethylindenyltitaniumtribenzyl, 2-methylindenyltitanium trichloride, 2-methylindenyltitaniumtrimethyl, 2-mrethylindenyltitanium trimethoxide, 1-methylindenyltitaniumtribenzyl, 1,2-dimethylindenyltitanium trichloride, 1,2-dimethylindenyltitaniumtrimethyl, 1,2-dimethylindenyltitanium trimethoxide, 1,2-dimethylindenyltitaniumtribenzyl, 1,3-dimethylindenyltitanium trichloride, 1,3-dimethylindenyltitaniumtrimethyl, 1,3-dimethylindenyltitanium trimethoxide, 1,3-dimethylindenyltitaniumtribenzyl, 1,2,3-trimethylindenyltitanium trichloride, 1,2,3-trimethylindenyltitaniumtrimethyl, 1,2,3-trimethylindenyltitanium trimethoxide, 1,2,3-trimethylindenyltitaniumtribenzyl, 1,2,3,4,5,6,7-heptamethylindenyltitanium trichloride, 1,2,3,4,5,6,7-heptamethylindenyltitaniumtrimethyl, 1,2,3,4,5,6,7-heptamethylindenyltitanium triethoxide, 1,2,3,4,5,6,7-heptamethylindenyltitaniumtribenzyl, 4,5,6,7-tetrahydroindenyltitaniumn trichloride, 4,5,6,7-tetrahydroindenyltitaniumtrimethyl, 4,5,6,7-tetrahydroindenyltitanium trimethoxide, 4,5,6,7-tetrahydroindenyltitaniumtribenzyl, 1-methyl-4,5,6,7-tetrahydroindenyltitanium trichloride, 1-methyl-4,5,6,7-tetrahydroindenyltitaniumtrimethyl, 1-methyl-4,5,6,7-tetrahydroindenyltitanium trimethoxide, 1-methyl-4,5,6,7-tetrahydroindenyltitaniumtribenzyl, 2-methyl-4,5,6,7-tetrahydroindenyltitanium trichloride, 2-methyl-4,5,6,7-tetrahydroindenyltitanium trimethoxide, 2-methyl-4,5,6,7-tetrahydroindenyltitaniumtribenzyl, 1,2-dimethyl-4,5,6,7-tetrahydroindenyltitanium trichloride, 1,2-dimethyl-4,5,6,7-tetrahydroindenyltitaniumtrimethyl, 1,2-dimethyl-4,5,6,7-tetrahydroindenyltitanium trimethoxide, 1,2-dimethyl-4,5,6,7-tetrahydroindenyltitaniumtribenzyl, 1,3-dimethyl-4,5,6,7-tetrahydroindenyltitanium trichloride, 1,3-dimethyl-4,5,6,7-tetrahydroindenyltitaniumtrimethyl, 1,3-dimethyl-4,5,6,7-tetrahydroindenyltitanium trimethoxide, 1,3-dimethyl-4,5,6,7-tetrahydroindenyltitaniumtribenzyl, 1,2,3-trimethyl-4,5,6,7-tetrahydroindenyltitanium trichloride, 1,2,3-trimethyl-4,5,6,7-tetrahydroindenyltitaniumtrimethyl, 1,2,3-trimethyl-4,5,6,7-tetrahydroindenyltitanium trimethoxide, 1,2,3-trimethyl-4,5,6,7-tetrahydroindenyltitaniumtribenzyl, 1-ethyl-4,5,6,7-tetrahydroindenyltitanium trichloride, 1-ethyl-4,5,6,7-tetrahydroindenyltitaniuntrimethyl, 1-ethyl-4,5,6,7-tetrahydroindenyltitanium trimethoxide, 1-ethyl-4,5,6,7-tetrahydroindenyltitaniumtribenzyl, 1-ethyl-2-methyl-4,5,6,7-tetrahydroindenyltitanium trichloride, 1-ethyl-2-methyl-4,5,6,7-tetrahydroindenyltitaniumtrimethyl, 1-ethyl-2-methyl-4,5,6,7-tetrahydroindenyltitanium trimethoxide, 1-ethyl-2-methyl-4,5,6,7-tetrahydroindenyltitaniuntribenzyl, 1-ethyl-3-methyl-4,5,6,7-tetrahydroindenyltitanium trichloride, 1-ethyl-3-methyl-4,5,6,7-tetrahydroindenyltitanium trichloride, 1-ethyl-3-methyl-4,5,6,7-tetrahydroindenyltitaniumtrimethyl, 1-ethyl-3-methyl-4,5,6,7-tetrahydroindenyltitanium trimethoxide, 1-ethyl-3-methyl-4,5,6,7-tetrahydroindenyltitaniumtribenzyl, 1-ethyl-2,3-dimethyl-4,5,6,7-tetrahydroindenyltitanium trichloride, 1-ethyl-2,3-dimethyl-4,5,6,7-tetrahydroindenyltitaniumtrimethyl, 1-ethyl-2,3-dimethyl-4,5,6,7-tetrahydroindenyltitanium trimethoxide, 1-ethyl-2,3-dimethyl-4,5,6,7-tetrahydroindenyltitaniumtribenzyl, 1,2-diethyl-4,5,6,7-tetrahydroindenyltitanium trichloride, 1,2-diethyl-4,5,6,7-tetrahydroindenyltitaniumtrimethyl, 1,2-diethyl-4,5,6,7-tetrahydroindenyltitanium trimethoxide, 1,2-diethyl-4,5,6,7-tetrahydroindenyltitaniumtribenzyl, 1,2-diethyl-3-methyl-4,5,6,7-tetrahydroindenyltitanium trichloride, 1,2-diethyl-3-methyl-4,5,6,7-tetrahydroindenyltitaniumtrimethyl, 1,2-diethyl-3-methyl-4,5,6,7-tetrahydroindenyltitanium trimethoxide, 1,2-diethyl-3-methyl-4,5,6,7-tetrahydroindenyltitaniumtribenzyl, 1,3-diethyl-4,5,6,7-tetrahydroindenyltitanium trichloride, 1,3-diethyl-4,5,6,7-tetrahydroindenyltitaniumtrimethyl, 1,3-diethyl-4,5,6,7-tetrahydroindenyltitanium trimethoxide, 1,3-diethyl-4,5,6,7-tetrahydroindenyltitaniumtribenzyl, 1,3-diethyl-2-methyl-4,5,6,7-tetrahydroindenyltitanium trichloride, 1,3-diethyl-2-methyl-4,5,6,7-tetrahydroindenyltitaniumtrimethyl, 1,3-diethyl-2-methyl-4,5,6,7-tetrahydroindenyltitanium trimethoxide, 1,3-diethyl-2-methyl-4,5,6,7-tetrahydroindenyltitaniumtribenzyl, 1,2,3-triethyl-4,5,6,7-tetrahydroindenyltitanium trichloride, 1,2,3-triethyl-4,5,6,7-tetrahydroindenyltitaniumtrimethyl, 1,2,3-triethyl-4,5,6,7-tetrahydroindenyltitanium trimethoxide, 1,2,3-triethyl-4,5,6,7-tetrahydroindenyltitaniumtribenzyl, 2-ethyl-4,5,6,7-tetrahydroindenyltitanium trichloride, 2-ethyl-4,5,6,7-tetrahydroindenyltitaniumtrimethyl, 2-ethyl-4,5,6,7-tetrahydroindenyltitanium trimethoxide, 2-ethyl-4,5,6,7- tetrahydroindenyltitaniumtribenzyl, 1-methyl-2-ethyl-4,5,6,
7-tetrahydroindenyltitanium trichloride, 1-methyl-2-ethyl-4,
5,6,7-tetrahydroindenyltitaniumtrimethyl, 1-methyl-2-ethyl-
4,5,6,7-tetrahydroindenyltitanium trimethoxide, 1-methyl-
2-ethyl-4,5,6,7-tetrahydroindenyltitaniumtribenzyl, 1,3-
dimethyl-2-ethyl-4,5,6,7-tetrahydroindenyltitanium
trichloride, 1,3-dimethyl-2-ethyl-4,5,6,7-tetrahydroin-
denyltitaniumtrimethyl, 1,3-dimethyl-2-ethyl-4,5,6,7-
tetrahydroindenyltitanium trimethoxide, 1,3-dimethyl-2-
ethyl-4,5,6,7-tetrahydroindenyltitaniumtribenzyl, 1,2,3,4-
tetrahydrofluorenyltitanium trichloride, 1,2,3,4-
tetrahydrofluorenyltitaniumtrimethyl, 1,2,3,4-
tetrahydrofluorenyltitanium trimethoxide, 1,2,3,4-
tetrahydrofluorenyltitaniumtribenzyl, 9-methyl-1,2,3,4-
tetrahydrofluorenyltitanium trichloride, 9-methyl-1,2,3,4-
tetrahydrofluorenyltitaniumtrimethyl, 9-methyl-1,2,3,4-
tetrahydrofluorenyltitanium trimethoxide, 9-methyl-1,2,3,4-
tetrahydrofluorenyltitaniumtribenzyl, 9-ethyl-1,2,3,4-
tetrahydrofluorenyltitanium trichloride, 9-ethyl-1,2,3,4-
tetrahydrofluorenyltitaniumtrimethyl, 9-ethyl-1,2,3,4-
tetrahydrofluorenyltitanium trimethoxide, 9-ethyl-1,2,3,4-
tetrahydrofluorenyltitaniumtribenzyl, 1,2,3,4,5,6,7,8-
octahydrofluorenyltitanium trichloride, 1,2,3,4,5,6,7,8-
octahydrofluorenyltitaniumtrimethyl, 1,2,3,4,5,6,7,8-
octahydrofluorenyltitanium trimethoxide, 1,2,3,4,5,6,7,8-
octahydrofluorenyltitaniumtribenzyl, 9-methyl-1,2,3,4,5,6,
7,8-octahydrofluorenyltitanium trichloride, 9-methyl-1,2,3,
4,5,6,7,8-octahydrofluorenyltitaniumtrimethyl, 9-methyl-1,
2,3,4,5,6,7,8-octahydrofluorenyltitanium trimethoxide,
9-methyl-1,2,3,4,5,6,7,8-octahydrofluorenyltitanium
trichloride, 9-ethyl-1,2,3,4,5,6,7,8-octahydrofluorenyltitani-
umtrimethyl, 9-ethyl-1,2,3,4,5,6,7,8-octahydrofluorenyl-
titanium trimethoxide, 9-ethyl-1, 2,3,4,5,6,7,8-
octahydrofluorenyltitaniumtribenzyl, etc.; as well as their
derivatives to be produced by substituting the titanium
element in those compounds with zirconium or hafnium, or
with any other element of different Groups, and also their
analogues having a transition metal element of lanthanides.
However, these are not limitative. Of these, preferred are
titanium compounds.

The catalyst of the invention may contain one or more of
the transition metal compounds either singly or as combined
for the component (A).

(B) Organoaluminiumoxy Compound:

The organoaluminiumoxy compound for the component
(B) is not specifically defined, and may be any one that may
be obtained through reaction of an organoaluminium com-
pound with water. As specific examples of the compound,
mentioned are commercial products from Albemarle Cor-
poration and Shering Corporation, etc.

Also mentioned are aluminiumoxy compounds of
so-called linear aluminoxanes of the following general for-
mula (XI) and cyclic aluminoxanes of the following general
formula (XII), of which the basic structures are disclosed in
many known references.

(XI)

wherein $R^9$ represents a hydrocarbon group, such as an
alkyl, alkenyl, aryl, arylalkyl or the like group having from
1 to 20, preferably from 1 to 12 carbon atoms, or a halogen
atom; w indicates a degree of mean polymerization, and is
an integer generally falling between 2 and 50, preferably
between 2 and 40; and plural $R^9$'s may be the same or
different.

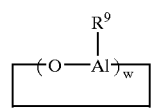

(XII)

wherein $R^9$ and w have the same meanings as in formula
(XI).

For producing the aluminoxanes, an organoaluminium
compound may be contacted with a condensation agent such
as water or the like, for which the mode of condensation is
not specifically defined and the reactants may be reacted in
any ordinary manner. For it, for example, employable is (1)
a method comprising dissolving an organoaluminium com-
pound in an organic solvent followed by contacting it with
water; (2) a method comprising directly adding an orga-
noaluminium compound to the polymerization system that
requires the intended aluminoxane, followed by adding
water thereto; (3) a method comprising reacting an orga-
noaluminium compound with crystal water existing in metal
salts and the like or with water having adsorbed by inorganic
or organic substances; or (4) a method comprising reacting
a tetraalkyldialuminoxane with a trialkylaluminium and then
with water. The aluminoxanes may be insoluble in toluene.

Any others produced according to the techniques dis-
closed in known references are also usable herein. The
references are, for example, Japanese Patent Laid-Open
Nos. 328520/1997, 278824/1997, etc. In the invention, one
or more of the aluminiumoxy compounds mentioned above
may be used either singly or as combined.

The starting organoaluminium compounds for the orga-
noaluminiumoxy compounds for use in the invention are not
specifically defined, and include various types of organoalu-
minium compounds. For example, usable are alkyl-having
aluminium compounds of the following general formula
(XIII):

$$R^{10}{}_m Al(OR^{11})_n X_{3-m-n}$$ (XIII)

wherein $R^{10}$ and $R^{11}$ each represent an alkyl group having
from 1 to 8, preferably from 1 to 4 carbon atoms; X
represents a hydrogen atom or a halogen atom; $0<m\leq3$,
preferably m=2 or 3, most preferably m=3; $0\leq n<3$, prefer-
ably n=0 or 1.

Examples of the compounds are trialkylaluminium com-
pounds such as trimethylaluminium, triethylaluminium,
tripropylaluminium, triisopropylaluminium, tri-n-
butylmethylaluminium, triisobutylaluminium, tri-sec-
butylmethylaluminium, tri-tert-butylmethylaluminium,
tripentylaluminium, trihexylaluminium, trioctylaluminium,
tridecylaluminium, tricyclohexylaluminium,
tricyclooctylaluminium, etc.; halogen-, alkoxy- or hydroxyl-
having alkylaluminium compounds such as dimethylalu-
minium chloride, diethylaluminium chloride, ethylalu-
minium sesquichloride, dimethylaluminium methoxide,
diethylaluminium methoxide, dimethylaluminium
hydroxide, diethylaluminium hydroxide, etc.; hydrogen-
having alkylaluminium compounds such as dimethylalu-
minium hydride, diisobutylaluminium hydride, etc. In the
invention, one or more of the organic aluminium compounds
mentioned above may be used either singly or as combined.

For the component (B), preferred are organoalumini-
umoxy compounds which are obtained through reaction of
an organoaluminium compound with water and which are
soluble in hydrocarbon solvents. The merits of the organoaluminiumoxy compounds soluble in hydrocarbon solvents are that, when they are used as a catalyst for olefin polymerization, the polymers obtained could have good morphology as containing a reduced amount of fine powder and having a large mean particle size, and, in addition, the organoaluminiumoxy compounds not carried on inorganic compounds could be recycled. The hydrocarbon solvents include, for example, aromatic hydrocarbons such as benzene, toluene, xylene, cumene, cymene, etc.; aliphatic hydrocarbons such as pentane, hexane, heptane, octane, decane, dodecane, hexadecane, octadecane, etc.; alicyclic hydrocarbons such as cyclopentane, cyclohexane, cyclooctane, methylcyclopentane, etc.; petroleum fractions such as naphtha, kerosene, light gas oil, etc. Of those, especially preferred are aromatic hydrocarbons. Also preferably, the organoaluminiumoxy compound for use in the invention contains at most 10% by weight of an organoaluminium compound remaining therein, when measured through $^1$H-NMR, since the proportion of the organoaluminiumoxy compound capable of being carried on an inorganic compound (this is hereinafter referred to as an on-carrier percentage of the compound) increases. More preferably, the amount of the organoaluminium compound remaining in the organoaluminiumoxy compound falls between 3 and 5% by weight or lower, most preferably between 2 and 4% by weight or lower. If the amount of the organoaluminium compound remaining in the organoaluminiumoxy compound is larger than 10% by weight, it is undesirable since the on-carrier percentage of the organoaluminiumoxy compound will decrease and the polymerization activity thereof will thereby decrease.

The fraction not soluble in hydrocarbon solvents such as those mentioned above may be removed from the organoaluminiumoxy compound, for which the method is not specifically defined. For example, one method comprises processing the organoaluminiumoxy compound in a hydrocarbon solvent to lead to spontaneous precipitation of the fraction not soluble in the solvent, followed by removing the insoluble fraction through decantation. Another method comprises removing the insoluble fraction through centrifugation or the like. More preferably, the thus-recovered, soluble fraction is filtered through a G5 glass filter or the like in a nitrogen atmosphere, whereby the insoluble fraction is more completely removed from it. The thus-processed organoaluminiumoxy compound will have an increased amount of a gelled fraction with the lapse of time. Therefore, it is desirable that the organoaluminiumoxy compound is used within 48 hours after its preparation, more preferably immediately after its preparation. The ratio of the organoaluminiumoxy compound to the hydrocarbon solvent is not specifically defined, but it is desirable that the amount of the organoaluminiumoxy compound falls between 0.5 and 10 mols in terms of the aluminium atom in the compound relative to 1 liter of the hydrocarbon solvent.

For obtaining the organoaluminiumoxy compound in which the amount of the organoaluminium compound remaining is at most 10% by weight, the method is not specifically defined. For example, one method comprises drying up the solution of the organoaluminiumoxy compound to completely remove the solvent from it through distillation to dryness under heat under reduced pressure (this is referred to as a drying-up method). In the drying-up method under heat under reduced pressure, it is desirable that the solvent is evaporated away at a temperature not higher than 80° C., more preferably not higher than 60° C. At temperatures of 80° C. or higher, the insoluble fraction in the solution of the organoaluminiumoxy compound will greatly increase, and the activity of the transition metal-carried catalyst that contains the compound will be low. The degree of the reduced pressure in the process may be generally 30 mmHg or lower, but preferably 20 mmHg or lower. Determination of organoaluminiums may be effected in accordance with the disclosure in Organometallics, Vol. 17, No. 10, (1998), pp. 1941–1945.

(C) Carrier:

The carrier for use in the invention is not specifically defined, and may be any of inorganic oxide carriers, and other inorganic carriers and organic carriers. From the viewpoint of polymer morphology control, preferred are inorganic oxide carriers and other inorganic carriers. As examples of the inorganic oxide carriers and other inorganic carriers, mentioned are inorganic compounds that contain at least one element selected from Groups 2 to 4 and Groups 12 to 14 of the Periodic Table. At least one element selected from Groups 2 to 4 and Groups 12 to 14 of the Periodic Table is C, Mg, Al, Si, Ca, Sc, Ti, B, Tl, Ge, Sn, Zn, Ba, Pb, Y, Sr, Th, etc. As the carrier for use in the invention, preferred are inorganic compounds especially inorganic oxides, as their capability to carry the catalyst components thereon is good. The inorganic oxides include $SiO_2$, $Al_2O_3$, MgO, $ZrO_2$, $TiO_2$, $Fe_2O_3$, $B_2O_3$, CaO, ZnO, BaO, $ThO_2$, etc. In addition, also employable are silica-alumina, zeolite, ferrite, glass fibers, etc. Zeolite includes natural substances such as mordenite, etc.; synthetic products such as zeolite X, zeolite Y, zeolite A, etc.; high-silica zeolite with $(SiO_2/Al_2O_3) \geq 20$, such as typically ZSM-5; zeolite analogues such as ALPO, SAPO, etc.; amorphous zeolite such as MCM-41, MCM-50, etc., any of which is employable herein.

The inorganic oxides may contain minor carbonates, nitrates, sulfates, etc. Apart from the inorganic compounds noted above, also employable herein are magnesium compounds of a general formula $MgR^{12}_xX^2_y$ and their complexes. In the formula, $R^{12}$ represents an alkyl group having from 1 to 20 carbon atoms, an alkoxy group having from 1 to 20 carbon atoms, or an aryl group having from 6 to 20 carbon atoms; $X^2$ represents a halogen atom, or an alkyl group having from 1 to 20 carbon atoms; x falls between 0 and 2, y falls between 0 and 2, and x+y=2. Plural $R^{12}$'s and plural $X^2$'s may be the same or different. Specific examples of the compounds are $MgCl_2$, $Mg(OC_2H_5)_2$, etc. The organic carriers usable herein include polymers such as polystyrenes, styrene-divinylbenzene copolymers, polyethylenes, polypropylenes, substituted polystyrenes, polyarylates, etc.; as well as starch, carbon, etc.

Preferably, the carrier for use in the invention is porous. The porous carrier shall have a pore volume of generally from 0.1 to 5 cm$^3$/g, but preferably from 0.3 to 3 cm$^3$/g, and a specific surface area of generally from 1 to 1000 m$^2$/g, but preferably from 50 to 500 m$^2$/g. If any of its specific surface area and pore volume oversteps the defined range, the catalyst activity will below. The pore volume and the specific surface area of the carrier may be derived from the volume of the nitrogen gas having been absorbed by the carrier, for example, according to the BET method (see J. Am. Chem. Soc., Vol. 60, p. 309 (1983)).

More preferably, the carrier for use in the invention is in the form of fine particles, as its capability to carry catalyst components thereon is better. Though varying depending on its type and on the method for producing it, the particulate carrier may have a mean particle size generally falling between 1 and 300 μm, but preferably between 10 and 200 μm, more preferably between 20 and 100 μm. If the particle size of the carrier is too small, fine powder will increase in the polymers produced; but if too large, coarse and large grains will increase in the polymers produced to thereby lower the bulk density of the polymers, and, in addition, the carrier will clog hoppers. It is desirable that the carrier is baked generally at a temperature falling between 120 and 1000° C., but preferably between 200 and 800° C., before used in the invention.

As the carrier for use in the invention, preferred are $MgCl_2$, $MgCl(OC_2H_5)$, $Mg(OC_2H_5)_2$, $SiO_2$, $Al_2O_3$, etc. Of these, more preferred are $SiO_2$ and $Al_2O_3$.

The method for producing the olefin polymerization catalyst of the invention is mentioned below. For producing the catalyst, two or more components of (A), (B) and (C) mentioned above are contacted with each other, and the condition for contacting them is not specifically defined. Like known Ziegler-Natta catalysts and metallocene catalysts, the catalyst of the invention may be produced under ordinary conditions. For example, the components may be contacted with each other in an inert gas atmosphere optionally containing a solvent, at a temperature falling between –30° C. and the boiling point of the solvent used. The inert gas may be argon gas or nitrogen gas. The solvent includes aromatic hydrocarbons such as benzene, toluene, xylene, cumene, cymene, etc.; aliphatic hydrocarbons such as pentane, hexane, heptane, octane, decane, dodecane, hexadecane, octadecane, etc.; alicyclic hydrocarbons such as cyclopentane, cyclohexane, cyclooctane, methylcyclopentane, etc.; petroleum fractions such as naphtha, kerosene, light gas oil, etc. Of those, especially preferred are aromatic hydrocarbons.

The order of contacting them is not specifically defined. For example, any two of the components (A), (B) and (C) may be contacted at a time, or any one of them may be contacted with the other one. The three components may be contacted all at a time, or any two of them may be first contacted with each other and then with the remaining one. While being contacted with each other, the components are exposed to elastic waves at least once during the process of contacting them. For example, any of the following methods are employable for contacting the three components with each other.

(1) A method of contacting the three components (A), (B) and (C) all at a time while being exposed to elastic waves;

(2) A method of contacting (A) with (B) while being exposed to elastic waves, and then further contacting them with (C);

(3) A method of contacting (A) with (B) while being exposed to elastic waves, and then further contacting them with (C) while still being exposed to elastic waves;

(4) A method of contacting (A) with (B), followed by further contacting them with (C) while being exposed to elastic waves;

(5) A method of contacting (A) with (C) while being exposed to elastic waves, and then further contacting them with (B);

(6) A method of contacting (A) with (C) while being exposed to elastic waves, and then further contacting them with (B) while still being exposed to elastic waves;

(7) A method of contacting (A) with (C), followed by further contacting them with (B) while being exposed to elastic waves;

(8) A method of contacting (B) with (C) while being exposed to elastic waves, and then further contacting them with (A);

(9) A method of contacting (B) with (C) while being exposed to elastic waves, and then further contacting them with (A) while still being exposed to elastic waves;

(10) A method of contacting (B) with (C), followed by further contacting them with (A) while being exposed to elastic waves.

Of these methods, preferred are (9) and (10).

Elastic waves to which the catalyst components are exposed in the invention are of elastic vibration that propagates through elastic materials. In general, they are longitudinal waves which contract and expand in the direction of their travel, but are often transverse waves around reactor walls and around the interface at which the catalyst components are contacted with each other. In the invention, any known elastic waves are employable with no specific limitation. In general, preferred are sound waves, and especially preferred are ultrasonic waves. Concretely, the elastic waves for use in the invention are preferably ultrasonic waves of which the frequency falls between 1 and 1000 kHz, more preferably between 10 and 500 kHz, even more preferably between 20 and 300 kHz. The power of the ultrasonic waves is preferably at least 10 W, more preferably at least 100W, even more preferably at least 500 W. It is desirable that the catalyst components are exposed to the elastic waves of that type in such a manner that the wave strength could be at least 0.01 $W/cm^2$, more preferably at least 0.05 $W/cm^2$, even more preferably from 0.07 to 100 $W/cm^2$, at the inner wall of the reactor where the catalyst components are contacted with each other. The strength of ultrasonic waves can be obtained as follows. A reactor is filled with a reference liquid, water, to which are applied ultrasonic waves. In that condition, the sound pressure in the reactor is measured with a sound pressure meter (Kaijol's TYPE 1501, provided with a probe of UTSP-60 and a cable of USC-150), from which is obtained the ultrasonic wave strength according to the following formula:

$$I=P^2/\rho c$$

wherein I indicates the ultrasonic wave strength; P indicates the sound pressure; $\rho$ indicates the density of the medium (water); and c indicates the sound wave velocity in the medium.

In the invention, elastic waves may be applied to the reactor in which the catalyst components are contacted with each other, from the wave-generating surface disposed outside the reactor; or the wave-generating surface may be disposed inside the reactor so that the reaction system in the reactor could be directly exposed to elastic waves from it. When passing through the reactor wall, elastic waves are often attenuated owing to transmission loss (the ratio of the transmitted wave energy to the incident wave energy at the point of measurement) Therefore, in the invention, the wave-generating surface is preferably disposed inside the reactor so that the catalyst components being contacted with each other therein could be directly exposed to elastic waves from it. Elastic waves are attenuated more in the place remoter from the wave source. Therefore, it is desirable to appropriately determine and control the position of the wave-generating surface, the shape of the reactor, the wave strength at the wave-generating surface, the disposition and the number of the wave sources and other conditions for wave exposure. Elastic waves have the capability to agitate the reaction system. Therefore, irrespective of its shape, the reactor for use herein does not always require a stirrer, but is preferably equipped with a stirrer. The temperature at which the reaction system is exposed to ultrasonic waves may fall between −200° C. and the boiling point of the solvent used, but preferably between room temperature and 100° C. The exposure time is not specifically defined so far as the intended catalyst components could be obtained within it, but is generally within 20 hours, preferably within 10 hours.

The blend ratio of the components (A), (B) and (C) that are contacted with each other to form the olefin polymerization catalyst of the invention may be generally such that the amount of the component (B) falls between 0.0001 and 200000 mols, preferably between 30 and 5000 mols, relative to one mol of the component (A), and the amount of the component (C) falls between 0.001 and 10 g, preferably between 0.01 and 1 g, relative to one mol of the component (A). If the blend ratio oversteps the defined ranges, the activity of the catalyst will be low.

As having been exposed to elastic waves in the manner mentioned above, the contact efficiency of the components of the olefin polymerization catalyst of the invention is improved, and the polymerization activity of the catalyst is thereby increased. For example, when the catalyst contains the component (C) serving as a carrier, the catalyst components can be well carried on the carrier to its depth, since they are exposed to elastic waves, being different from those carried on the carrier in an ordinary manner. As a result, the number of the active points effective for olefin polymerization in the catalyst increases, and the activity of the catalyst is thereby enhanced. The olefin polymerization catalyst of the invention does not always require the component (C). In this case, the catalyst components are in a uniform system, and the uniform-system catalyst of the invention also enjoys the same effect as above. Preferably, however, the catalyst contains the component (C), and is in the form of a non-uniform system.

[II] Method for Producing Olefin Polymerization Catalyst

For producing the olefin polymerization catalyst of the invention, the components (A), (B) and optionally (C) are contacted with each other. In the method, the components are exposed to elastic waves at least in any step of contacting them with each other. The details of the method for producing the olefin polymerization catalyst are described hereinabove.

[III] Method for Producing Olefinic Polymers

The method of the invention for producing olefinic polymers includes homopolymerization of olefins or copolymerization of olefins with other olefins and/or other monomers (that is, copolymerization of different types of olefins, or copolymerization of olefins with other monomers, or copolymerization of different types of olefins with other monomers) in the presence of the olefin polymerization catalyst optionally along with an organoaluminium compound.

As the organoaluminium compound, usable are the compounds of formulae (XI) to (XIII) mentioned above. Preferred are trialkylaluminium compounds such as triisobutylaluminium, etc. The amount of the organoaluminium compound to be used may be generally such that the molar ratio of aluminium in the organoaluminium compound to the transition metal in the component (A) falls between 1:0 and 1:10000.

Olefins to be polymerized in the invention are not specifically defined, but preferred are α-olefins having from 2 to 20 carbon atoms. More preferred are ethylene, propylene and styrene; and even more preferred is propylene. Polypropylenes obtained by polymerizing propylene in the presence of the olefin polymerization catalyst of the invention could have a high degree of stereospecificity and a high molecular weight.

Olefins to be polymerized herein include, for example, α-olefins such as ethylene, propylene, 1-butene, 3-methyl-1-butene, 4-methyl-1-butene, 4-phenyl-1-butene, 1-pentene, 3-methyl-l-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinylcyclohexane, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; and cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc.; Styrenic monomers to be polymerized herein include, for example, styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; and also trimethylsilylstyrene, vinylbenzoates, divinylbenzene.

In the invention, one or more olefins may be homopolymerized or copolymerized either singly or as combined. Where two or more different olefins are copolymerized, the olefins noted above may be combined in any desired manner.

In the invention, olefins such as those mentioned above may be copolymerized with any other comonomers. The comonomers include, for example, linear diolefins such as butadiene, isoprene, 1,4-pentadiene, 1,5-hexadiene, etc.; polycyclic olefins such as norbornene, 1,4,5,8-dimethano-1,2,3,4,4a,5,8,8a-octahydronaphthalene, 2-norbornene, etc.; cyclic diolefins such as norbornadiene, 5-ethylidenenorbornene, 5-vinylnorbornene, dicyclopentadiene, etc.; and unsaturated esters such as ethyl acrylate, methyl methacrylate, etc.

The mode of olefin polymerization is not specifically defined, and herein employable is any desired polymerization mode of slurry polymerization, solution polymerization, vapor-phase polymerization, bulk polymerization or suspension polymerization. Preferred are modes of slurry polymerization and vapor-phase polymerization. Solvents may be used in polymerization of the monomers. They include hydrocarbons and halogenohydrocarbons such as benzene, toluene, xylene, n-hexane, n-heptane, cyclohexane, chloromethylene, chloroform, 1,2-dichloroethane, chlorobenzene, etc. One or more such solvents may be used either singly or as combined. Depending on their type, the monomers to be polymerized may also serve as solvents.

In view of the catalytic activity for polymerization and of the reactor efficiency, it is desirable that the amount of the catalyst to be in the polymerization system is so controlled that the amount of the component (A) could fall generally between 0.1 and 100 μmols, but preferably between 0.5 and 25 μmols, in one liter of the solvent in the system.

Regarding the polymerization condition, the pressure may fall generally between ordinary pressure and 200 MPa·G. The reaction temperature may fall generally between −50 and 250° C. For controlling the molecular weight of the polymers to be produced, the type and the amount of the catalytic components to be used and the polymerization temperature will be suitably selected. If desired, hydrogen may be introduced into the polymerization system for that purpose.

The invention is described more concretely with reference to the following Examples, which, however, are not intended to restrict the scope of the invention.

EXAMPLE 1

Three-component Catalyst (1) Preparation of Catalyst Carried on Carrier:

Contact of Component (C) with component (B):

$SiO_2$ (Fuji Silicia's P-10, having a mean particle size of 45 μm, a pore volume of 1.4 cm³/g and a specific surface area of 300 m²/g) (27.1 g) was put into a 500 ml Schlenk tube, and dried at 200° C. under pressure for 4 hours. The baked $SiO_2$ weighed 25.9 g. The baked $SiO_2$ was put into 400 ml of toluene cooled at −78° C. in a dry ice/methanol bath, and stirred. With stirring, 145.5 ml of a solution of methylaluminoxane/toluene (1.5 mols/liter) was dropwise added to the resulting suspension through a dropping funnel, which took 1.0 hour to the end. After left as such for 4 hours, this was heated from −78° C. up to 20° C. over a period of 6.0 hours, and then further left as it was for 4.0 hours. Next, this was heated from 20° C. up to 80° C. over a period of 1.0 hour, and then left at 80° C. for 4.0 hours. Through the process, the reaction between silica and methylaluminoxane was completed. The resulting suspension was filtered at 60° C., and the solid residue was washed twice with 400 ml of toluene at 60° C. and twice with 400 ml of n-hexane at 60° C. The thus-washed solid was dried at 60° C. under reduced pressure for 4.0 hours, whereby was obtained 33.69 g of silica-carried methylaluminoxane in which the proportion of methylaluminoxane was 23.12% by weight. N-heptane was added to all the silica-carried methylaluminoxane to be 500 ml in total. The suspension thus prepared had a methylaluminoxane concentration of 0.27 mols/liter.

(2) Preparation of Catalyst Carried on Carrier:

Contact of Component (A) with Silica-carried Methylaluminoxane:

At room temperature, 2.0 mmols (7.41 ml) of the silica-carried methylaluminoxane prepared in the above was put into a Schlenk tube having been purged with dry nitrogen, to which was added 20 ml of n-heptane and stirred. To the resulting suspension, added was 1.0 μmol of rac-$Me_2Si$(2-Me-4,5-BenzInd)$_2ZrCl_2$ [racemi-dimethylsilylenebis(2-methyl-4,5-benzoindenyl)zirconium dichloride] in toluene that had been produced in accordance with the disclosure in Japanese Patent Laid-Open Nos. 184179/1994 and 196734/1995. The mixture was kept stirred, while the Schlenk tube containing it was exposed to ultrasonic waves (frequency: 20 kHz, power: 700 W) from an ultrasonic wave generator (Seidensha Kogyo's SONOPET1200B), in an aqueous medium at 30° C. for 20 minutes. Stirring it was stopped, and the solid catalyst component was made precipitated. It was confirmed that the precipitated solid catalyst component was red and that the solution was colorless and transparent. The process thus gave a silica-carried metallocene catalyst.

(3) Polymerization of Propylene:

A 1.4-liter stainless pressure autoclave equipped with a stirrer was heated at 45° C., then fully degassed and dried, thereafter purged with dry nitrogen up to atmospheric pressure, and cooled to room temperature. In a dry nitrogen atmosphere, 400 ml of dry deoxygenated heptane and 1 ml of a heptane solution of triisobutylaluminium (1.0 M) were put into the autoclave. After these were stirred for 15 minutes, the silica-carried metallocene catalyst that had been prepared in the previous step (2) was added thereto. With these being stirred at 500 rpm, propylene was continuously introduced into the autoclave to be at a gauge pressure of 0.7 MPa·G, and heated up to 50° C. In that condition, propylene was polymerized for 1 hour. After the reaction, the non-reacted propylene was removed by degassing the autoclave. The reaction mixture was poured into a large amount of methanol, in which polypropylene formed was precipitated. The polymer polypropylene was taken out through filtration and dried, and it weighed 81.0 g. The catalyst activity was 888 (kg/g-Zr).

EXAMPLE 2

Two-component Catalyst (1) Production of rac-$Me_2Si$(2-Et-4,5-BenzInd)$_2ZrCl_2$ [racemi-dimethylsilylenebis(2-ethyl-4,5-benzoindenyl)zirconium dichloride]:

Based on the disclosure in Japanese Patent Laid-Open Nos. 184179/1994 and 196734/1995, the entitled compound was produced via the following (I) to (VI):

Production of Diethyl ethyl(2-naphthylmethyl)malonate (I):

7.63 g (320 mmol) of sodium was dissolved in 200 ml of anhydrous ethanol under heat, to which was dropwise added 58.1 ml (310 mmols) of diethyl ethylmalonate at room temperature. A solution of 64 g (310 mmols) of 2-bromonaphthalene dissolved in 300 ml of ethanol was gradually and dropwise added thereto at 0° C., and the reaction mixture was heated under reflux for 5 hours. This was poured into water with ice, and extracted with ethyl acetate. The organic phase was dried with anhydrous sodium sulfate, and the solvent was evaporated away. 50 ml of hexane was added to the oily residue, and cooled to 0° C. A solid product of (I) thus obtained weighed 71.2 g. Its yield was 70%.

Production of 2-ethyl-3-naphthylpropionic acid (II):

A solution of 33.8 g (603 mmols) of potassium hydroxide dissolved in 100 ml of water was dropwise added to 49.3 g (150 mmols) of compound (I) in 150 ml of ethanol, and the reaction mixture was heated under reflux for 4 hours. The solvent was evaporated away, and ethyl acetate and water were added to the resulting solid. This was made to have a pH of 1 with hydrochloric acid added thereto. This was dried with anhydrous magnesium sulfate, and the solvent was evaporated away from the organic phase. Hexane was added to the residue, and stirred. The resulting brown solid was transferred into a flask, and heated at 175° C. Heating it was continued while it gave vapor. Then, this was cooled to room temperature, and the brown solid (II) thus separated weighed 30 g. Its yield was 87%.

Production of 2-ethyl-6,7-Benzoindan-1-one (III):

29 ml of thionyl chloride was added to 30 g (131 mmols) of compound (II), and the resulting mixture was heated under reflux for 30 minutes. Next, the excess thionyl chloride was evaporated away under reduced pressure. To the residue, added was 50 ml of methylene chloride. The resulting solution was gradually and drop wise added to a suspension of 35 g (262 mmols) of aluminium trichloride in 100 ml of methylene chloride. After the addition, this was further heated under reflux for 30 minutes. This was poured onto ice, and extracted with methylene chloride. The organic phase was dried with anhydrous sodium sulfate, and the solvent was evaporated away. The resulting dark brown oil was subjected to silica gel column chromatography with a developer solvent of hexane/ethyl acetate=8/2, and 11.3 g of compound (III) was obtained. Its yield was 41%.

Production of 2-ethyl-4,5-benzoindene (IV):

11.3 g (53.7 mmols) of the indanone (III) was dissolved in 400 ml of a mixed solvent of THF/methanol (2/1), to which was added 3.0 g (80.5 mmols) of sodium borohydride little by little. The reaction mixture was stirred at room temperature for 12 hours. The solution was poured onto ice, to which was added hydrochloric acid. This was extracted with ether, and the organic phase was washed with water and then dried with anhydrous sodium sulfate. The solvent was evaporated away, and the resulting orange oil was dissolved in 300 ml of toluene. The solution was heated at 80° C. for 15 minutes along with 0.77 g (4.26 mmols) of p-toluenesulfonic acid added thereto. This was cooled to room temperature, washed a few times with water, and dried with anhydrous sodium sulfate, and the solvent was evaporated away. The residue was subjected to silica gel column chromatography with a developer solvent of hexane/ethyl acetate=20/1, and 6.2 g of a colorless oil, compound (IV) was obtained. Its yield was 59%.

Production of dimethylbis(2-ethyl-4,5-benzoindenyl) silane (V):

6.2 g (31.7 mmols) of the indene (IV) was dissolved in 50 ml of THF, to which was dropwise added 20.7 ml of 1.53 M hexane solution of n-butyllithium (31.7 mmols). The reaction mixture was heated under reflux for 1 hour. The resulting solution was dropwise added to a solution of 1.93 g (15 mmols) of dimethyldichlorosilane in 10 ml of THF, and heated under reflux for 6 hours. The reaction solution was hydrolyzed, and extracted with ether. The organic phase was dried with anhydrous sodium sulfate, and the solvent was evaporated away. The residue was subjected to silica gel column chromatography with a developer solvent of hexane/ethyl acetate (3%), and 2.8 g of compound (V) was obtained. Its yield was 41%.

Production of rac-$Me_2Si(2$-Et-4,5-BenzInd$)_2ZrCl_2$ [racemi-dimethylsilylenebis(2-ethyl-4,5-benzoindenyl) zirconium dichloride] (VI):

20 ml of THF was added to 2.8 g (6.3 mmols) of compound (V), to which was dropwise added 10.3 ml of 1.53 M hexane solution of n-butyllithium (15.8 mmols). The reaction mixture was stirred at room temperature for 12 hours. The solvent was evaporated away, and the residue was washed with hexane. The resulting powder was dried under reduced pressure. This was suspended in 25 ml of methylene chloride, to which was added 1.5 g (6.3 mmols) of zirconium tetrachloride suspended in 25 ml of methylene chloride. The reaction mixture was stirred at room temperature for 12 hours, then the solvent was evaporated away, and the residue was extracted with 20 ml of toluene. The residue resulting from the toluene extraction was further extracted with methylene chloride, and the extract was concentrated and kept cooled. Thus was obtained 1.3 g of metallocene (VI). Its yield was 35%.

(2) Preparation of Catalyst:

Contact of Component (A) with Component (B):

At room temperature, 20 ml of toluene, 1 mmol of methylalumoxane and 1 mmol of the rac-$Me_2Si(2$-Et-4,5-BenzInd$)_2ZrCl_2$[racemi-dimethylsilylenebis(2-ethyl-4,5-benzoindenyl)zirconium dichloride] prepared in the above were put into a Schlenk tube having been purged with dry nitrogen. The mixture was kept stirred, while the Schlenk tube containing it was exposed to ultrasonic waves (frequency: 20 kHz, power: 700 W) from an ultrasonic wave generator (Seidensha Kogyo's SONOPET1200B), in an aqueous medium at 30° C. for 3 minutes.

(3) Polymerization of Propylene:

400 ml of heptane, 0.5 mmols of triisobutylaluminium, and 0.1 μmols, in terms of zirconium, of the catalyst prepared in the above were put into a 1.4-liter stainless autoclave. Propylene gas was introduced into the autoclave to be at a total pressure of 0.8 MPa·G. Introducing propylene thereinto was so controlled via a pressure controller that the pressure in the autoclave could be all the time constant during the process of propylene polymerization. In that condition, propylene was polymerized at 50° C. for 60 minutes. After the reaction, the reaction mixture was taken out of the autoclave, and dried under pressure to isolate the propylene polymer formed, which weighed 8.0 kg. The catalyst activity was 877 (kg/g-Zr)

Comparative Example 1

(1) Production of Silica-carried Metallocene Catalyst:

2.0 mmols (7.41 ml) of the silica-carried methylaluminoxane prepared in Example 1 was put into a container that had been purged with dry nitrogen, and 20 ml of n-heptane was added thereto and stirred. To the resulting suspension, added was a toluene solution of 1.0 μmol of rac-$Me_2Si(2$-Me-4,5-BenzInd$)_2ZrCl_2$ [racemi-dimethylsilylenebis(2-methyl-4,5-benzoindenyl)zirconium dichloride], and kept stirred at room temperature for 0.5 hours. Stirring it was stopped, and the solid catalyst component was made precipitated. It was confirmed that the precipitated solid catalyst component was red and that the solution was colorless and transparent. The process thus gave a silica-carried metallocene catalyst.

(2) Polymerization of Propylene:

A 1.4-liter stainless pressure autoclave equipped with a stirrer was heated at 45° C., then fully degassed and dried, thereafter purged with dry nitrogen up to atmospheric pressure, and cooled to room temperature. In a dry nitrogen atmosphere, 400 ml of dry deoxygenated heptane and 1 ml of a heptane solution of triisobutylaluminium (1.0 M) were put into the autoclave. After these were stirred for 15 minutes, the silica-carried metallocene catalyst that had been prepared in the previous step (1) was added thereto. With these being stirred at 500 rpm, propylene was continuously introduced into the autoclave to be at a gauge pressure of 0.7 MPa·G, and heated up to 50° C. In that condition, propylene was polymerized for 1 hour. After the reaction, the non-reacted propylene was removed by degassing the autoclave. The reaction mixture was poured into a large amount of methanol, in which polypropylene formed was precipitated. The polymer polypropylene was taken out through filtration and dried, and it weighed 45.6 g. The catalyst activity was 445 (kg/g-Zr).

COMPARATIVE EXAMPLE 2

400 ml of heptane, 0.5 mmols of triisobutylaluminium, 0.1 mmols of methylalumoxane, and 0.1 mmols of rac-$Me_2Si(2$-Et-4,5-BenzInd$)_2ZrCl_2$ [racemi-dimethyl-silylenebis(2-ethyl-4,5-benzoindenyl)zirconium dichloride] were put into a 1.4-liter stainless autoclave. Propylene gas was introduced into the autoclave to be at a total pressure of 0.8 MPa·G. Introducing propylene thereinto was so controlled via a pressure controller that the pressure in the autoclave could be all the time constant during the process of propylene polymerization. In that condition, propylene was polymerized at 50° C. for 60 minutes. After the reaction, the reaction mixture was taken out of the autoclave, and dried under pressure to isolate the propylene polymer formed, which weighed 2.1 g. The catalyst activity was 230 (kg/g-Zr).

EXAMPLE 3

Two-component Catalyst
(1) Preparation of Catalyst:
20 ml of toluene, 3.8 mmols of triisobutylaluminium, 11.3 mmols of a promoter, methylaluminoxane, and 0.15 mmols of an organic metal complex compound, pentamethylcyclopentadienyltitanium trimethoxide were put into a Schlenk at 20° C., the Schlenk having been fully dried and purged with nitrogen. The Ti concentration in the resulting mixture was controlled to be 3 mmols/liter. The mixture was kept stirred ultrasonically for 10 minutes, while the Schlenk containing it was exposed to ultrasonic waves (frequency: 20 kHz, power: 700 W) from an ultrasonic wave generator (Seidensha Kogyo's SONOPET1200B), in an aqueous medium at 30° C. for 3 minutes. A catalyst was prepared through the process.
(2) Polymerization of Styrene:
4.5 g (43 mmols) of styrene was put into a reactor having been fully dried and purged with nitrogen, and well stirred therein. This was heated up to 70° C., to which was added 42 μl of the catalyst that had been prepared in the previous step (1), and the monomer styrene was polymerized. After this was kept polymerized at 70° C. for 60 minutes, 500 cc of methanol was added thereto to stop the polymerization. The resulting polymer was washed with methanol, and dried at 200° C. for 2 hours. The yield of the polymer was 1.58 g. The polymer had a weight-average molecular weight of 1,800,000.

EXAMPLE 4

Two-component Catalyst
(1) Preparation of Catalyst:
A catalyst was prepared in the same manner as in Example 3. In this, however, it was prepared at 4° C. while the Schlenk having been fully dried and purged with nitrogen and containing it was kept in a water bath with ice.
(2) Polymerization of Styrene:
Styrene was polymerized and the polymer formed was dried in the same manner as in Example 3. In this, however, used was the catalyst prepared in the previous step (1). The yield of the polymer was 1.13 g. The polymer had a weight-average molecular weight of 1,920,000.

COMPARATIVE EXAMPLE 3

Two-component Catalyst
(1) Preparation of Catalyst:
A catalyst was prepared in the same manner as in Example 3. In this, however, the mixed catalyst solution was aged without using the ultrasonic wave generator.

(2) Polymerization of Styrene.
Styrene was polymerized and the polymer formed was dried in the same manner as in Example 3. In this, however, the catalyst solution prepared in the previous step (1) was used in place of the catalyst prepared in Example 3. The yield of the polymer was 1.26 g. The polymer had a weight-average molecular weight of 1,880,000.

COMPARATIVE EXAMPLE 4

Two-component Catalyst
(1) Preparation of Catalyst:
A catalyst was prepared in the same manner as in Comparative Example 3. In this, however, it was prepared at 4° C. while the Schlenk containing it was kept in a water bath with ice.
(2) Polymerization of Styrene.
Styrene was polymerized and the polymer formed was dried in the same manner as in Example 2. In this, however, used was the catalyst prepared in the previous step. The yield of the polymer was 0.54 g. The polymer had a weight-average molecular weight of 1,920,000.

The data obtained are shown in Table 1.

TABLE 1

|  | Styrene Fed to Reactor (g) | Catalyst Preparation Temperature (° C.) | Ultrasonic Wave Generator | Polymerization Temperature (° C.) | Amount of Polymer Produced (g) | Yield (%) | Mw |
| --- | --- | --- | --- | --- | --- | --- | --- |
| Example 3 | 4.5 | 20 | used | 70 | 1.58 | 35 | 1900000 |
| Example 4 | 4.5 | 4 | used | 70 | 1.13 | 25 | 1800000 |
| Comparative Example 3 | 4.5 | 20 | not used | 70 | 1.26 | 28 | 1880000 |
| Comparative Example 4 | 4.5 | 4 | not used | 70 | 0.54 | 12 | 1920000 |

INDUSTRIAL APPLICABILITY

The activity of the metallocene catalysts for olefin polymerization of the invention, which are produced according to the method of the invention where ultrasonic waves are used, is higher than that of conventional metallocene catalysts. In the invention, the catalyst cost can be reduced, and the catalyst residue in polymers can be reduced. The catalysts of the invention are favorable to vapor-phase or slurry polymerization.

What is claimed is:
1. An improved catalyst, with increased contact efficiency and resultant increased polymerization activity, comprising (A) a compound of a transition metal of Groups 4 to 6 of the Periodic Table, (B) an organoaluminumoxy compound, and (C) a carrier, the catalyst being produced by a process including a step of contacting component (C) with at least one of component (A) and component (B), while exposed to ultrasonic waves having a frequency of 1 to 1000 kHz, said catalyst having increased active points for olefin polymerization and enhanced activity as a result of said exposure to ultrasonic waves.
2. The catalyst according to claim 1, which is produced by a process comprising a step of simultaneously contacting component (A), component (B) and the component (C) while exposing to ultrasonic waves.
3. The catalyst according to claim 1, which is produced by the process comprising:
contacting two of component (A), component (B) and component (C) while exposing to the ultrasonic waves, thereby obtaining a contact product; and further contacting the contact product with the remaining third component.

4. The catalyst according to claim 1, which is produced by a process comprising:
contacting two of component (A), component (B) and component (C) while exposing to the ultrasonic waves, thereby obtaining a contact product; and further contacting the contact product with the remaining third component while exposing to the ultrasonic waves.

5. The catalyst according to claim 4, wherein component (B) and component (C) are contacted first, and component (A) is then contacted with the contact product.

6. The catalyst according to claim 1, which is produced by a process comprising:
contacting two of component (A), component (B) and component (C), thereby obtaining a contact product; and
further contacting the contact product with the remaining third component while exposing to ultrasonic waves.

7. The catalyst according to claim 6, wherein component (B) and component (C) are first contacted, and component (A) is then contacted with the contact product.

8. The catalyst according to claim 1, wherein component (A) is selected from the group consisting of the following general formulae (I), (II) and (III):

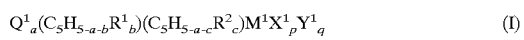

$$Q^1{}_a(C_5H_{5-a-b}R^1{}_b)(C_5H_{5-a-c}R^2{}_c)M^1X^1{}_pY^1{}_q \quad (I)$$

$$Q^2{}_a(C_5H_{5-a-d}R^3{}_d)Z^1M^1X^1{}_pY^1{}_q \quad (II)$$

$$(C_5H_{5-a-d}R^3{}_d)M^1X^1{}_rY^1{}_s \quad (III)$$

wherein $Q^1$ represents a bonding group that crosslinks the two conjugated five-membered cyclic ligands $(C_5H_{5-a-b}R^1{}_b)$ and $(C_5H_{5-a-c}R^2{}_c)$; $Q^2$ represents a bonding group that crosslinks the conjugated five-membered cyclic ligand $(C_5H_{5-a-d}R^3{}_d)$ and the group $Z^1$; $R^1$, $R^2$ and $R^3$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; b, c and d each represent an integer of from 0 to 5 when a=0, or an integer of from 0 to 4 when a=1, or an integer of from 0 to 3 when a=2; p+q=(valence of $M^1$)–2; r+s=(valence of $M^1$)–1; $M^1$ represents a transition metal of Groups 4 to 6 of the Periodic Table; $X^1$, $Y^1$ and $Z^1$ each represent a covalent-bonding or ionic-bonding ligand; plural $X^1$'s and $Y^1$'s, if any, may be the same or different, and may be bonded to each other to form a cyclic structure.

9. The catalyst according to claim 1, wherein the component (C) has a mean particle size of from 1 to 300 μm, a specific surface area of from 1 to 1000 m²/g, and a pore volume of from 0.1 to 5 cm³/g.

10. A method for producing a catalyst comprising (A) a compound of a transition metal of groups 4 to 6 of the Periodic Table, (B) an organoaluminumoxy compound, and (C) a carrier, the method comprising:
contacting component (C) with at least one of component (A) and component (B) while exposing to ultrasonic waves having a frequency of 1 to 1000 kHz.

11. A method for producing a catalyst comprising (A) a compound of a transition metal of Groups 4 to 6 of the Periodic Table, (B) an organoaluminumoxy compound, and (C) a carrier, the method comprising simultaneously contacting component (A), component (B) and component (C) while exposing to the ultrasonic waves.

12. A method for producing a catalyst comprising (A) a compound of a transition metal of groups 4 to 6 of the Periodic Table, (B) an organoaluminumoxy compound, and (C) a carrier, the method comprising:
contacting component (C) with at least one of component (A) and component (B) while exposing to ultrasonic waves, thereby obtaining a contact product; and
further contacting the contact product with the remaining third component.

13. A method for producing a catalyst comprising (A) a compound of a transition metal of Groups 4 to 6 of the Periodic Table, (B) an organoaluminumoxy compound, and (C) a carrier, the method comprising:
contacting two of component (A), component (B) and component (C) while exposing to the ultrasonic waves, thereby obtaining a contact product; and
further contacting the contact product with the remaining third component while exposing to the ultrasonic waves.

14. The Method according to claim 13, wherein component (B) and component (C) are first contacted, and component (A) is then contacted with the contact product.

15. The method according to claim 10, comprising:
contacting two of component (A), component (B) and component (C), thereby obtaining a contact product; and
further contacting the contact product with the remaining third component while exposing to the ultrasonic waves.

16. The method according to claim 15, wherein component (B) and component (C) are first contacted, and component (A) is then contacted with the contact product.

17. A method for producing olefinic polymers, which comprises polymerizing or copolymerizing an olefin by vapor-phase or slurry polymerization polymerization while forming granular particles of the olefinic polymers in the presence of the catalyst of claim 1.

18. The method according to claim 17, wherein the olefin is polymerized or copolymerized in the further presence of an organoaluminum compound.

* * * * *